D. BOURQUE.
SOCKET FOR FASTENERS.
APPLICATION FILED AUG. 2, 1918.

1,305,520. Patented June 3, 1919.

Inventor:
David Bourque.
by Emery, Booth, Janney & Varney
Attys.

UNITED STATES PATENT OFFICE.

DAVID BOURQUE, OF AMESBURY, MASSACHUSETTS, ASSIGNOR TO G. W. J. MURPHY COMPANY, OF AMESBURY, MASSACHUSETTS, A CORPORATION OF MASSACHUSETTS.

SOCKET FOR FASTENERS.

1,305,520.  Specification of Letters Patent.  Patented June 3, 1919.

Application filed August 2, 1918. Serial No. 247,928.

*To all whom it may concern:*

Be it known that I, DAVID BOURQUE, a citizen of the United States, and a resident of Amesbury, in the county of Essex and Commonwealth of Massachusetts, (whose post-office address is Belmont street, Amesbury, Massachusetts,) have invented an Improvement in Sockets for Fasteners, of which the following description, in connection with the accompanying drawings, is a specification, like characters on the drawings representing like parts.

This invention relates to stud and socket fasteners such as are used, for example, in securing the curtains of motor vehicles. My improvements are directed more particularly to the construction of the female member or socket and the purpose is to provide a particularly efficient and durable device.

My invention will best be understood by reference to the following description of a single embodiment of my invention taken in connection with the illustration thereof in the accompanying drawings wherein:—

Figure 1:
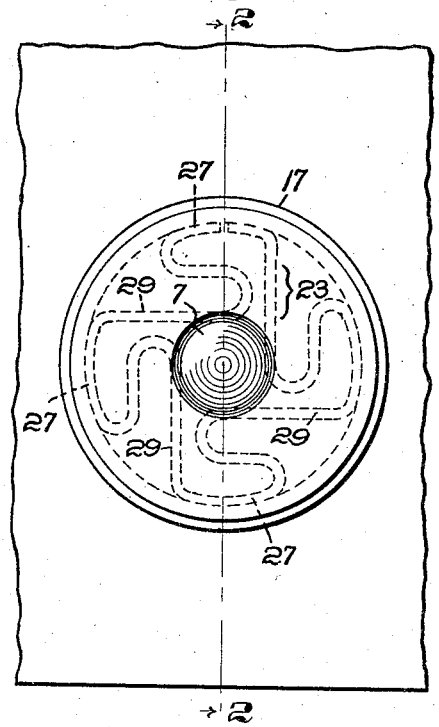
Figure 2:
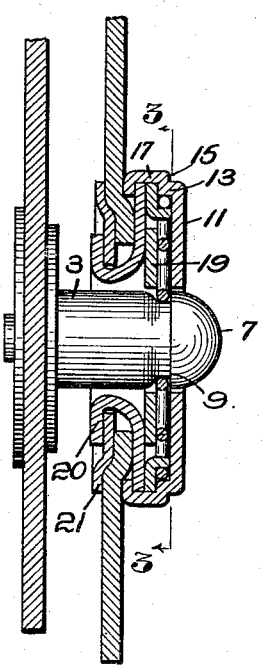

Figure 1 is a plan view of the fastener;

Fig. 2, a central, vertical section thereof; and

Figure 3:
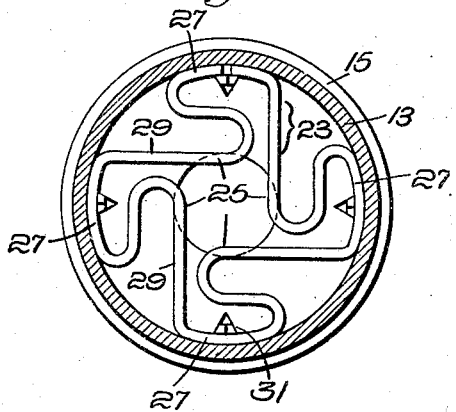

Fig. 3, a section of the socket on the line 3—3 of Fig. 2, showing only the socket.

Referring more particularly to Fig. 2 of the drawings, I there show a stud and socket fastener of the general type which I have disclosed in other places and comprising a stud member 3 adapted to be secured to any suitable support 5, as for example, part of the frame of a motor vehicle. This stud member is preferably comparatively long and terminates in an enlarged head 7 preferably joined to the shank of the fastener by an abrupt annular shoulder 9. The stud is adapted to be inserted in the socket member which is provided with jaws to engage behind the shoulder 9 to hold the parts together.

Referring still to Fig. 2, the socket member may consist, as there shown, of a cylindrical casing or eyelet having a front annular wall 11 and a short cylindrical wall 13. At the end of the cylindrical wall is formed a short annular flange 15, said flange forming a radial shoulder. At the outer end of the radial flange is formed the cylindrical portion 17. Within this cylindrical portion and bearing against the shoulder 15 may be disposed a washer 19 the purpose of which is to retain in place the spring jaws of the socket, as hereinafter described, the washer having a central aperture to admit the stud. Between the front wall 11 of the socket member and the washer 19 are arranged the spring locking jaws, the wall 11 being of sufficient length to form a narrow space or jaw-receiving chamber in which the jaw structure fits snugly but yet is free to be operated by the stud member. The socket member may be secured to the member which it is desired to fasten to the support 5, as for example, the curtain of a vehicle, in any desired manner and I have herein illustrated the tubular rivet 20 clenched over a washer 21, the opening of the rivet providing for the passage of the stud member 3 through the curtain.

The jaw system denoted as a whole by the numeral 23 in Fig. 1 is preferably formed from a length of spring wire bent as best seen in Fig. 3 to provide jaw portions 25, which are presented adjacent the opening in the socket and adapted to be pressed outwardly away from the center thereof by the enlarged head 7 of the stud when it is inserted and to snap back behind the shoulder. Preferably three or more jaws are provided and I have herein illustrated four. The purpose of this is to provide a symmetrical structure which is symmetrical in its action. Thus, however the socket may be applied to the curtain, if a portion thereof such as the lower portion in Fig. 1 is seized by the hand and the socket sharply tilted with a natural downward strain, which tilting is permitted because of the clearance provided by the length of the stud as already described, the jaw at the upper side of the stud will yield outwardly and the jaw at the lower side will be drawn past the shoulder 9 and moved over the head by the tipping movement referred to, thereby to release the stud. This action will take place only when the socket is sharply tipped by a voluntary manipulating movement.

It is desirable to make the socket of the fastener small and neat and at the same time the jaw system should be of considerable resiliency. Trouble has hitherto been experienced with these fasteners because the necessary range of yielding has forced too great a strain upon the jaws so that their limit of elasticity was reached or exceeded and it was found that they soon lost their resiliency and became set and therefore useless. The particular object of my invention is to provide a form of jaw system which, while forming a compact whole, will involve in its construction a great length of spring wire all of which will partake of the yielding movement when the socket is manipulated so that it will be sure in its action and will not lose its flexibility.

In Fig. 3 I have shown a suitable jaw structure illustrating my invention, there being four jaws 25, in this case formed from a single length of suitable resilient wire. Each jaw is the inner arm of a zigzag portion, each such portion having an outer arm 27 adapted to engage the interior circumference of the wall 13 and to be supported thereby. This zigzag arrangement of the wire provides great flexibility and utilizes a large amount of wire so that the necessary outward yielding of the jaws 25 is amply provided for without any approach to the resilient limit of the wire itself. To permit these zigzags to be made of large extent while minimizing the size of the entire jaw system, the inner or jaw-forming arm 25 of one zigzag is extended and merged into the outer arm 27 of an adjacent zigzag portion, this connection preferably proceeding as herein shown from one portion to another in the same sequence around the socket. In other words, the outer and intermediate arms of the zigzag herein shown and the connecting portions or outer extensions 29 of the inner jaw-forming arms 25 constitute substantially falcate or hook-like resilient portions lying outwardly of the jaws 25 and connecting the same, the resilient connecting portion of two jaws being, as it were, bent over and housed laterally of an adjacent portion, thus minimizing the spread of the wire from the center of the socket. The wire used as described constitutes essentially a fylfot or swastika. If four jaws are used, as in the present embodiment of the invention, the swastika will be of the customary four-arm form.

Preferably, as shown in Figs. 2 and 3, I strike up portions 31 from the washer 19 which engage the arms 27 and suspend the jaw system. The purpose of this is to prevent bodily movement of the jaw system. If the socket is drawn downwardly as described and the stud presses against the upper jaw there is a tendency for the lower jaw to be lifted without susbtantial increase of the opening between jaws. The provisions of the suspending lugs 31 prevent the lower zigzag part from lifting and restrict movement of the jaw system to a true yielding of the parts on the upper side. Such lugs may serve in addition to or in place of the flange 15 to space the washer 19 from the front wall of the socket.

From the above description it will be seen that I have provided a form of socket having a jaw system utilizing a great deal of wire and consequently very flexible and not subject to fatigue of the spring. Consequently, although the fastener is long used, the jaws will not become set and a very durable structure is therefore provided.

Having thus described one particular embodiment of my invention, what I claim as new and desire to secure by Letters Patent is:

1. A female element for a stud and socket fastener comprising a casing having an opening to receive a stud, jaws presented adjacent said opening and falcate or hook-like resilient portions lying outwardly of said jaws and connecting the same.

2. A female element for a stud and socket fastener comprising a casing having an opening to receive a stud, and a wire in said casing bent to provide a plurality of zigzag portions each having an inner branch for engagement with the stud presented adjacent the opening and an outer branch for engagement with the casing, each inner branch extending into the outer branch of an adjacent portion.

3. A female element for a stud and socket fastener having a stud receiving jaw comprising a wire bent substantially in the form of a fylfot or swastika.

In testimony whereof, I have signed my name to this specification.

DAVID BOURQUE.

Copies of this patent may be obtained for five cents each, by addressing the "Commissioner of Patents, Washington, D. C."